Patented Aug. 7, 1928.

1,679,919

UNITED STATES PATENT OFFICE.

FRANCIS M. ROGERS AND CLAUDE P. McNEIL, OF WHITING, INDIANA, ASSIGNORS TO STANDARD OIL COMPANY, OF WHITING, INDIANA, A CORPORATION OF INDIANA.

INSECTICIDE AND FUNGICIDE.

No Drawing. Application filed May 3, 1926. Serial No. 106,549.

This invention relates to improvements in insecticides and fungicides, and more particularly to insecticides and fungicides suitable for the treatment of seeds and plants.

In accordance with the present invention the improved composition comprises a mineral oil, a salt of sulfonic acid derived from mineral oil and an oil-dispersible copper derivative, and is capable of forming a stable emulsion with water which is suitable for application to plants and seeds for insecticidal and fungicidal purposes.

It is preferred to employ as the emulsifying compound the so-called "mahogany soaps" or alkali-metal salts of preferentially oil soluble sulfonic acids derived from mineral oil in the manner described in the Humphreys U. S. Patent No. 1,286,179 granted November 26, 1918, or in any other suitable manner. As the copper compound it is preferred to employ the corresponding copper sulfonate or copper sulfonates of the preferentially water-soluble sulfonic acids, derived from mineral oils in the manner described in Patent No. 1,474,933, granted November 20, 1923, to Humphreys and others, or in any other suitable manner; or we may employ the copper salt of naphthenic acids, for example, the naphthenic acids derived, as soaps, from coastal or other crudes which contain them, by treating a lubricant distillate thereof with alkali and extracting with alcohol.

The improved product preferably contains about 8 to 25% of the emulsifying agent about 10 to 30% of the copper compound and about 45 to 70% of mineral oil. The mineral oil employed is preferably a light mineral oil heavier than gasoline, as kerosene, straw oil or the like.

Although it is preferred to employ such copper compounds as are herein named, and which are particularly adapted for the production of freely emulsifiable compositions efficient in use, other oil dispersible copper derivatives, as the copper salts of organic acids, particularly of the fatty acid type (e. g. copper oleate) or the copper salt of "mahogany" acids may be employed.

The invention will be more fully appreciated from the following examples of preferred compositions, but it must be understood that these examples are illustrative only and that the invention is not limited thereto, since the invention comprises innumerable modifications thereof, within the scope of the appended claims.

Example I.

| | Per cent. |
|---|---|
| Mahogany soap | 18½ |
| Paraffin oil | 61½ |
| Copper naphthenate | 13½ |
| Water | 3½ |
| Alcohol | 3 |

Example II.

| | Per cent. |
|---|---|
| Mahogany soap | 11 |
| Paraffin oil | 52¾ |
| Copper sulfonate | 28 |
| Oleic acid | 1½ |
| 50% sodium hydroxide solution | ¼ |
| Alcohol | 3 |
| Water | 3½ |

In use the compositions thus constituted are mixed with from 10 to 1000 times their volume of water. Complete emulsion is readily effected and the emulsions are stable and suitable for spraying or otherwise applying to infected plants or seeds.

The improved insecticide has given greatly increased yields from diseased seeds, particularly Diplodia and Gibberella infected seeds, and is highly effective as a plant spray.

We claim:

1. A composition capable of readily forming a stable emulsion with water and effective as an insecticide and fungicide for plants and seeds, comprising a mineral oil, an oil dispersible copper compound and a salt of sulfonic acid derived from mineral oil.

2. A composition capable of readily forming a stable emulsion with water and effective as an insecticide and fungicide for seeds and plants comprising a mineral oil, a compound of copper with an acidic radical derived from mineral oil, and an emulsifying agent.

3. A composition capable of forming a stable emulsion with water and effective as an insecticide and fungicide for plants and seeds, comprising a salt of sulfonic acid derived from mineral oil, a compound of copper with an acidic radical derived from mineral oil and a mineral oil.

4. A composition capable of forming a stable emulsion with water and effective as an insecticide and fungicide for plants and seeds, comprising a salt of a preferentially oil-soluble sulfonic acid derived from mineral oil, a compound of copper with an acidic radical derived from mineral oil and a mineral oil.

5. A composition capable of forming a stable emulsion with water and effective as an insecticide and fungicide for plants and seeds, comprising a salt of a preferentially oil soluble sulfonic acid derived from mineral oil, a compound of copper with a sulfonic acid derived from mineral oil, and mineral oil.

6. A composition capable of forming a stable emulsion with water and effective as an insecticide and fungicide for plants and seeds, comprising an alkali mineral oil sulfonate, a copper mineral oil sulfonate, mineral oil and alcohol.

FRANCIS M. ROGERS.
CLAUDE P. McNEIL.